(12) United States Patent
Hasegawa et al.

(10) Patent No.: US 7,018,314 B2
(45) Date of Patent: Mar. 28, 2006

(54) ENGINE STARTER WITH IMPACT ABSORBER

(75) Inventors: Youichi Hasegawa, Kasugai (JP); Sadayoshi Kajino, Nagoya (JP)

(73) Assignee: Denso Corporation, Kariya (JP)

( * ) Notice: Subject to any disclaimer, the term of this patent is extended or adjusted under 35 U.S.C. 154(b) by 52 days.

(21) Appl. No.: 10/795,351

(22) Filed: Mar. 9, 2004

(65) Prior Publication Data

US 2004/0180746 A1 Sep. 16, 2004

(30) Foreign Application Priority Data

Mar. 11, 2003 (JP) .............................. 2003-064849

(51) Int. Cl.
*F16H 3/72* (2006.01)

(52) U.S. Cl. .............................. 475/5; 475/4; 475/149; 475/153; 74/6; 74/7 C; 74/7 E; 192/48.92; 192/55.1; 192/56.1; 123/179.25; 290/48

(58) Field of Classification Search .................... 475/2, 475/4, 5, 149, 153, 263, 264; 74/6, 7 A, 74/7 C, 7 E, 7 R; 192/55.1, 56.1, 48.92; 123/179.25; 290/48
See application file for complete search history.

(56) References Cited

U.S. PATENT DOCUMENTS

| | | | | |
|---|---|---|---|---|
| 4,635,489 A * | 1/1987 | Imamura et al. | ............... | 74/7 E |
| 5,101,953 A * | 4/1992 | Payvar | .................... | 192/107 R |
| 5,323,663 A * | 6/1994 | Ohgi et al. | .................... | 74/7 E |
| 5,905,310 A * | 5/1999 | Nagao | .......................... | 290/46 |
| 6,404,310 B1* | 6/2002 | Ando et al. | .................. | 335/133 |
| 6,572,479 B1* | 6/2003 | Saito et al. | ................... | 464/46 |
| 6,887,160 B1* | 5/2005 | Saito et al. | .................... | 464/46 |
| 2003/0041680 A1* | 3/2003 | Saito et al. | .................... | 74/7 E |
| 2004/0123686 A1* | 7/2004 | Kajino et al. | .................. | 74/7 E |

FOREIGN PATENT DOCUMENTS

| | | | |
|---|---|---|---|
| EP | 529456 A1 * | 3/1993 | |
| JP | 60184965 A * | 9/1985 | |
| JP | A 63-277859 | 11/1988 | |

* cited by examiner

*Primary Examiner*—Charles A. Marmor
*Assistant Examiner*—David D. Le
(74) *Attorney, Agent, or Firm*—Oliff & Berridge, PLC

(57) ABSTRACT

An engine starter equipped with an impact absorber. The impact absorber is arranged between a planetary gear train and an overrunning clutch of the starter. The absorber includes a friction plate which is disposed between a clutch outer and a carrier plate of the overrunning clutch and urged elastically into frictional abutment with the carrier plate. This structure eliminates the need for installing the friction plate on an internal gear of the planetary gear train, thus permitting the internal gear to be reduced in size.

8 Claims, 3 Drawing Sheets

ENGINE STARTER WITH IMPACT ABSORBER

BACKGROUND OF THE INVENTION

1. Technical Field of the Invention

The present invention relates generally to an electrical starter which may be employed to start automotive engines, and more particularly to such a starter equipped with an impact absorber disposed between a planetary gear train and an overrunning clutch to absorb undesirable impact energy.

2. Background Art

Japanese Patent First Publication No. 63-277859 discloses an engine starter for automotive vehicles which is equipped with a impact absorber. FIG. 4 shows such an engine starter. The impact absorber installed in the engine starter is made up of a center casing 100, a stationary disc 110 secured fixedly to the center casing 100, and a rotary disc 120 interposed between the center casing 100 and the stationary disc 110 in frictional contact therewith. The rotary disc 120 is fitted at an end thereof within a groove 131 formed in an internal gear 130 to be rotatable together with the internal gear 130 relative to the center casing 100. When an impact torque higher than a specified level is added undesirably to the rotary disc 120 through the internal gear 130, it will cause the rotary disc 120 to slide or rotate against the friction, thereby absorbing the impact energy.

The groove 131 within which the rotary disc 120 is fitted is formed away from teeth 132 of the internal gear 130 in an axial direction (i.e., a lateral direction, as viewed in the drawing) of the starter, thus resulting in an increased length of the internal gear 130. In a case where the starter is of a speed-reducing type designed to output a higher torque, the internal gear 130 is usually made of a high strength metal such as a sintered steel, thus resulting in an increased size of the internal gear 130, which leads to an increase in production cost of the starter.

SUMMARY OF THE INVENTION

It is therefore a principal object of the invention to avoid the disadvantages of the prior art.

It is another object of the invention to provide an engine starter equipped with an impact absorber disposed between a planetary gear train ad an overrunning clutch, which permits an internal gear of the planetary gear train to be reduced in size.

According to one aspect of the invention, there is provided an engine starter which may be employed to start an internal combustion engine for motor vehicles. The engine starter is designed to absorb an excessive impact torque caused by, for example, backlash of gears. The engine starter comprises: a motor working to output torque; a torque transmitting mechanism; and an impact absorber. The torque transmitting mechanism works to transmit the torque outputted by the motor to a ring gear of an engine and includes (a) a planetary gear train equipped with planet gears supported rotatably by gear spindles which are joined to a carrier plate, (b) an overrunning clutch which includes a clutch outer to which torque produced by reducing speed of an output of the motor through the planetary gear train is added through the carrier plate, a clutch inner having an inner helical spline formed on an internal circumferential wall thereof, and rollers and works to transmit the torque of the clutch outer to the clutch inner through the rollers, (c) an output shaft having an external helical spline which meshes with the internal helical spline of the clutch inner of the overrunning clutch for establishing travel of the output shaft within the clutch inner through a relative rotation between the external and internal helical splines, and (d) a pinion gear installed on the output shaft away to be displaceable by the travel of the output shaft away from the motor to establish mechanical engagement with the ring gear of the engine. The impact absorber works to absorb an undesirable impact energy applied to the power transmitting mechanism. The impact absorber includes at least one friction plate between the carrier plate and the clutch outer. When an impact torque added to the torque transmitting mechanism is smaller than a given level, the friction plate works to hold the carrier plate and the clutch outer from rotating relative to each other. Alternatively, when the impact torque is greater than the given level, the friction plate permits the carrier plate and the clutch outer from rotating relative to each other to absorb the undesirable impact energy acting on the power transmitting mechanism.

Use of the at least one friction plate between the carrier plate and the clutch outer permits the impact absorber to be reduced in size. The structure of the impact absorber eliminates the need for engagement of the friction plate with an internal gear of the planetary gear train, like the convention structure, as illustrated in FIG. 4, thus permitting the internal gear to be decreased in size. This results in a decrease in production costs of the engine starter.

In the preferred mode of the invention, one of the carrier plate and the clutch outer has a frictional surface facing the friction plate. The impact absorber also includes an elastic member working to elastically urge the friction plate into constant abutment with the frictional surface. Use of either of the carrier plate and the clutch outer as the friction surface minimizes required friction plates, thus allowing the length of the impact absorber in an axial direction of the starter to be decreased and also an area of the friction surface to be widened, which results in a decreased pressure applied to a unit area of the friction plate and an increased service life of the impact absorber.

The impact absorber may alternatively include a first friction plate and a second friction plate. The first friction plate is jointed to and held by the clutch outer from rotating relative to the clutch outer. The second friction plate is joined to and held by the gear spindles from rotating relative to the carrier plate. Specifically, the gear spindles installed on the carrier plate are used to hold the second friction plate from rotating, thus eliminating the need for joining the second friction plate directly to the carrier plate. This eliminates the need for any additional protrusions or grooves on or in the carrier plate required to hold the second friction plate.

The carrier plate and the clutch outer may have frictional surfaces, respectively. The friction plate may be made of an elastic member which is retained elastically between the frictional surfaces of the caner plate and the clutch outer so as to establish frictional abutment with the frictional surfaces of the carrier plate and the clutch outer. Specifically, use of the elastic member itself as the friction plate eliminates the need for any additional friction plates, thus resulting in a simplified structure of the impact absorber and also permitting the length of the impact absorber to be decreased.

The friction plate may be implemented by a wet type friction plate which has a friction surface coated with lubricant. This ensures the stability of sliding motion of the friction plate.

The overrunning clutch also includes a clutch cover disposed outside the clutch outer so as to surround the clutch outer. The clutch cover extends to the carrier plate to cover the impact absorber and the carrier plate. This structure may use the clutch cover to keep the elastic member compressed to apply an initial desired load thereto, thus eliminating the need for any additional parts to produce the initial desired load, which permits the impact absorber to be reduced in size.

One of the carrier plate and the clutch outer may have an elastic pressure producing member which acts physically on the elastic member to produce an elastic pressure which establishes the constant abutment of the friction plate with the frictional surface. This structure eliminates the need for the clutch cover to compress the elastic member, thus permitting the carrier plate to be designed not to collide with the clutch cover during rotation thereof, which results in decreased wear thereof.

One of the carrier plate and the clutch outer may have a hole. The other may have a boss fitted within the hole to establish coaxial alignment of the carrier plate and the clutch outer with each other. This structure serves to minimize an eccentric load on the clutch cover which arises from rotation of the carrier plate, thus permitting the clutch cover to be decreased in wall thickness and eliminating the need for machining an inner circumference of the clutch cover with high accuracy. This allows the impact absorber to be reduced in size and production costs.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
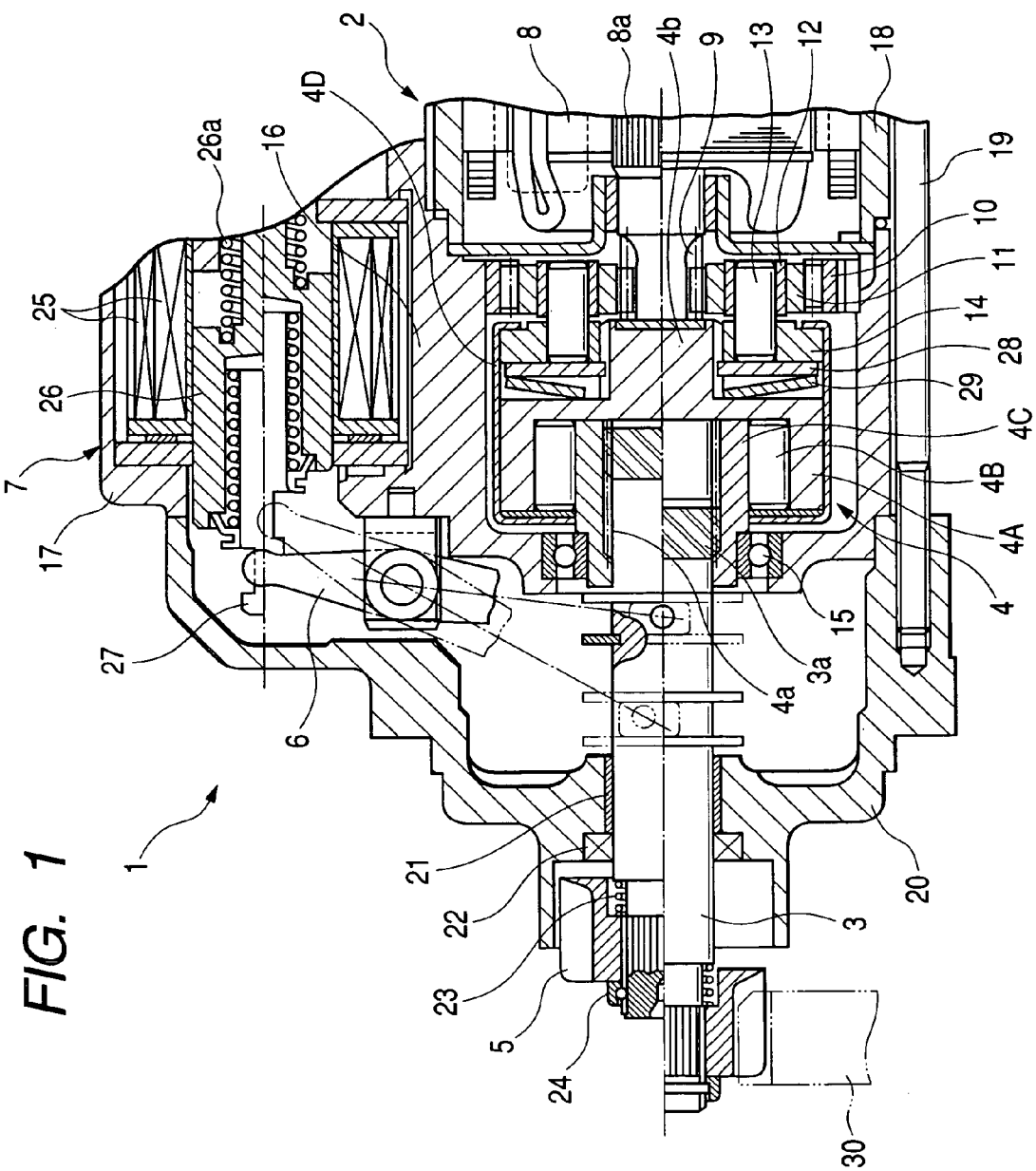
FIG. 1 is a partially longitudinal sectional view which shows an engine starter equipped with an impact absorber according to the first embodiment of the invention.

Referring to the drawings, wherein like reference numbers refer to like parts in several views, particularly to FIG. 1, there is shown a starter 1 according to the first embodiment of the invention which will be discussed below as an engine starter to be mounted in an automotive vehicle to start an internal combustion engine thereof. The starter 1 consists essentially of an electric motor 2, a planetary gear train, as will be described later in detail, an overrunning clutch 4 (also called a one-way clutch), a pinion gear 5, a solenoid switch 7, and an impact absorber, as will be described later in detail. The planetary gear train works to lower an output speed of the motor 2 and transmit it to an output shaft 3 through the overrunning clutch 4. The solenoid switch 7 works to selectively cut or supply an electric current to energize the motor 2 and also move the output shaft 3 in an axial direction (i.e., a lateral direction as viewed in the drawing) of the starter 1 through a shift lever 6. The impact absorber sets to absorb an excessive impact energy acting on a torque transmission mechanism between the motor 2 and a ring gear 30 connected to the engine.

The motor 2 is a known dc motor. The solenoid switch 7 has disposed within motor-energizing contacts which are to be closed to supply the current from a storage battery installed in the vehicle to an armature 8 to energize the motor 2.

The planetary gear train includes a sun gear 9 formed on an output shaft 81 of the motor 2 and planet gears 11 meshing with a ring-shaped internal gear 10 disposed coaxially with the sun gear 9. The planet gears 11 rotate about respective gear spindles 13 and revolves around a closed orbit, i.e., an inner circumference of the internal gear 10 to reduce the speed of the revolving armature 8. Each of the planet gears 11 is joined to a corresponding one of the gear spindles 13 through a bearing 12. The revolution of the planet gears 11 around the internal gear 10 is transmitted to a carrier plate 14 to which the spindles 13 are joined.

The overrunning clutch 4 is a known roller clutch which is usually used in typical engine starters and made up of a clutch outer 4A, rollers 4B, a clutch inner 4C, and a clutch cover 4D.

The clutch outer 4A undergoes the rotation of the carrier plate 14 transmitted through the impact absorber and rotates synchronously with the carrier plate 14.

The rollers 4B are disposed within a cam chamber (not shown) formed inside the clutch outer 4A. The rollers 4B are between an inner wall of the cam chamber and an outer wall of the clutch inner 4C. Upon rotation of the clutch outer 4A, the rollers 4B work to transmit torque from the clutch outer 4A to the clutch inner 4C.

The clutch inner 4C has formed on an end surface far from the motor 2 (i.e., a left end as viewed in the drawing) a centering extension on which a bearing 15 is mounted. The bearing 15 is retained by the center casing 16 and works to support the clutch inner 4C rotatably. The clutch inner 4C has an internal helical, spline formed on an inner wall thereof. The centering extension has an annular protrusion formed on an inner end wall thereof which works as a stopper to limit advancing movement of the output shaft 3 in the leftward direction, as viewed in the drawing.

The clutch cover 4D is fitted on the clutch outer 4A and surrounds the whole of the clutch outer 4A. The clutch cover 4D works to avoid jumping of the rollers 4B out of the clutch outer 4A. The clutch outer 4D has an end facing the motor 2 which is crimped inwardly and wrapped about a corner of the carrier plate 14.

The center casing 16 is formed integrally with a casing 17 of the solenoid switch 7 and covers the overrunning clutch 4, the impact absorber, and the planetary gear train. The center casing 16 is fitted at a rear end thereof (i.e., a right end as viewed in the drawing) to a front end (i.e., a left end as viewed in the drawing) of a motor yoke 18 and joined at a front end thereof to a front housing 20 through bolts 19 together with an end cover (not shown).

The output shaft 3 is supported rotatably by the front housing 20 through a bearing 21 and has formed on a rear end thereof an external helical spline $3a$ which is disposed inside the clutch inner $4c$ and meshes with the internal helical spline $4a$. Rotation of the internal helical spline $4a$ causes the external helical spline $3a$ to rotate, thereby moving the output shaft 3 in the axial direction of the starter 1 (i.e., a lateral direction as viewed in the drawing). A seal 22 such an oil seal is fitted on the output shaft 3 in front of the bearing 21 to preclude intrusion of water or dust into the housing 20.

The pinion gear 5 is joined to a head of the output shaft 3 (i.e., a portion projecting frontward from the bearing 21) in a spline fashion to be rotatable in unison with the output shaft 3. The pinion gear 5 is also urged frontward by a pinion spring 23 into abutment with a collar 24.

The solenoid switch 7 includes a coil 25 connected electrically with a starter switch (not shown) of the vehicle and a plunger 26 slidable within the coil 25. When the coil 25 is energized by the starter switch, it will cause the plunger 26 to be attracted rightward (as viewed in the drawing against a spring pressure of a coil spring 26a. This movement causes the shift lever 6 joined to the plunger 26 through a hook 27 to swing clockwise direction to move the output shaft 3 away from the motor 2 (i.e., in a leftward direction, as viewed in the drawing). Simultaneously, the motor-energizing contacts, as described above, of the solenoid switch 7 are closed.

The impact absorber includes a friction plate 28 and a spring plate 29. The friction plate 28 is disposed between the clutch outer 4A and an end surface of the carrier plate 14 which serves as a frictional surface in abutment with the friction plate 28. The spring plate 29 is disposed between the clutch outer 4A and the friction plate 28 and works to bring the friction plate 28 into constant abutment with the frictional surface of the carrier plate 14 under a preselected spring pressure.

The friction plate 28 is, as described above, urged by the spring plate 29 into frictional abutment with the frictional end surface of the carrier plate 14. The clutch outer 4A has a boss 4b formed integrally therewith. The friction plate 28 is fitted on the boss 4b to be held from rotating relative to the boss 4b.

The spring plate 29 is made of, for example, a disc spring and disposed between a rear end surface of the clutch outer 4A and the friction plate 28. The clutch cover 4D, as described above, holds therein the clutch outer 4A and carrier plate 14 firmly to press the spring plate 29 so as to produce a constant elastic pressure acting on the friction plate 28.

In operation of the starter 1, when the coil 25 of the solenoid switch 7 is energized to attract the plunger 26, it will cause the shift lever 6 to move the output shaft 3 away from the motor 2. This causes the external helical spline 3a of the output shaft 3 to revolute along the internal helical spline 4a of the clutch inner 4C, thereby advancing the output shaft 3 in the leftward direction, as viewed in the drawing. Upon abutment of the pinion gear 5 to the ring gear 30 of the engine, the output shaft 3 halts while compressing the pinion spring 23.

When the plunger 26 has moved to close the motor-energizing contacts of the solenoid switch 7, it will cause the armature 8 to be energized, so that it rotates. The output speed of the armature 8 is reduced by the planetary gear train and transmitted to the clutch inner 4C through the clutch outer 4A and the rollers 4B. This causes the clutch inner 4C to rotate to turn the output shaft 3. Upon engagement of the pinion gear 5 with the ring gear 30, the torque of the output shaft 3 is transmitted to the ring gear 30 to crank the engine.

When the starter switch is turned off after start-up of the engine, the coil 25 is deenergied, so that the attractive force acting on the plunger 26 disappears. This causes the plunger 26 to be returned by the spring pressure of the spring 26a back to an initial position thereof, which movement, in turn, causes the motor-energizing contacts to be opened to deenergize the armature 8.

The movement of the plunger 26 toward the initial position thereof also causes the shift lever 6 to move the output shaft 3 in the rightward direction to bring the pinion gear 5 into disengagement from the ring gear 30. Upon abutment of the rear end of the output shaft 3 with the end of the boss 4b, the output shaft 3 halts.

The operation of the impact absorber will be described below.

When the torque added to the torque transmission mechanism made up of parts disposed from the sun gear 9 to the pinion gear 5 is lower than a given level, that is, when the torque is smaller than the degree of friction created between the friction plate 28 and the carrier plate 14, the friction plate 28 holds the carrier plate 14 and the clutch outer 4A from rotating relative to each other, thus causing the torque of the carrier plate 14 to be transmitted to the clutch outer 4A through the friction plate 28, so that the carrier plate 14 rotates in synchronization with the clutch outer 4A.

Usually, upon engagement of the pinion gear 5 with the ring gear 30, the backlash therebetween causes an instant impact to arise from output torque of the motor 2 upon start-up thereof which, in turn, acts on the torque transmission mechanism. When such an impact torque is higher than the given level, it causes the friction plate 28 to slide on or rotate relative to the carrier plate 14, thereby absorbing an excessive impact energy.

The overrunning clutch 4 is so designed that torque causing sliding of a can surface in a roller-locking direction is set higher than a maximum torque of the friction plate 28 in order to avoid breakage of the overrunning clutch 4 during normal usage thereof.

Figure 4:
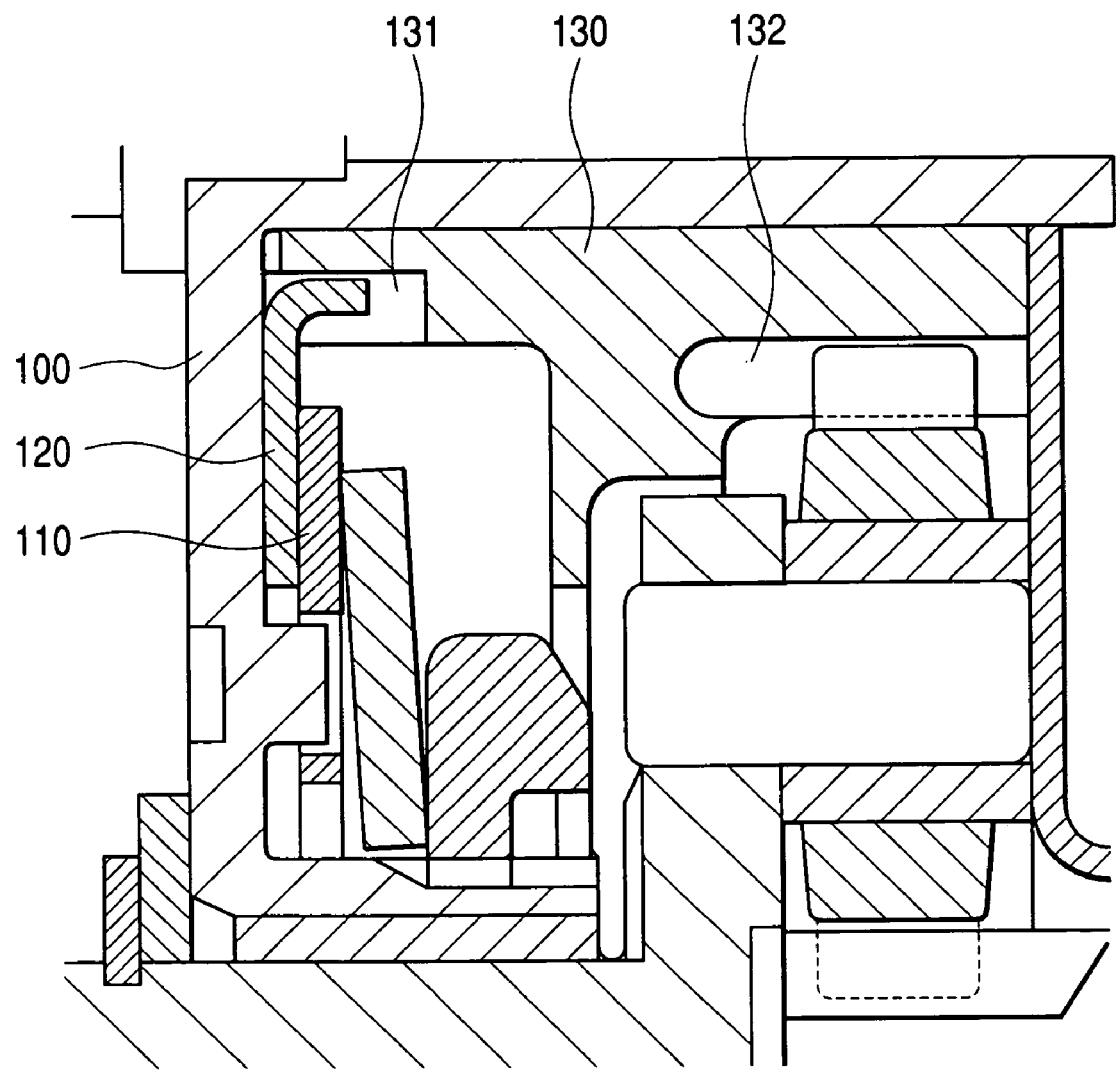
FIG. 4 is a partially sectional view which shows an impact absorber installed in a conventional engine starter.

As apparent from the above discussion, the starter 1 has the impact absorber disposed between the carrier plate 14 and the clutch outer 4A. The friction plate 28 is joined to the boss 4b formed integrally with the clutch outer 4A to control the rotation of the clutch outer 4A. This permits the internal gear 10 to be reduced in size. Specifically the internal gear 130 of the conventional starter, as illustrated in FIG. 4, is required to have a longer length extending in the axial direction of the starter, but the structure of this embodiment eliminates the need for an extended length of the internal gear 130, thus permitting the size of the starter 1 to be reduced, which results in decreased production costs of the starter 1.

The impact absorber employs the end of the carrier plate 14 facing the clutch outer 4A as the fictional surface, thus permitting the number of friction plates mating therewith to be minimized. In this embodiment, the single friction plate 1 is used. This also allows the length of the impact absorber in the axial direction of the starter 1 to be decreased. An excessive impact energy may alternatively be absorbed by friction developed between the clutch outer 4A and the friction plate 28. This is accomplished by forming a frictional surface on the rear end of the outer clutch 4A, affixing the friction plate 28 onto the front end of the carrier plate 14, and elastically urging the friction plate 28 against the frictional surface of the outer clutch 4A. This structure, like the above, permits the frictional surface of the outer clutch 4A to be widened as compared with the structure of FIG. 4, thus resulting in a decreased pressure acting on a unit area of the fiction plate 28, which prolongs the service life of the impact absorber.

The clutch cover 4D is crimped at the end thereof on the corner of the carrier plate 14 to compress the spring plate 29 to an extent that applies an elastic constant load to the friction plate 28 required to develop a desired degree of initial friction, thus eliminating the need for additional parts for applying a required constant load to the friction plate 28.

The location of a circumferential wall of the carrier plate 14 is set by the clutch cover 4D, thus facilitating the ease with which the carrier plate 14 is positioned in coaxial alignment with the clutch outer 4A. This minimizes an eccentric load applied from the carrier plate 14 to the clutch outer 4A, thus resulting a greatly decreased loss of torque from the carrier plate 14 to the clutch outer 4A.

Figure 2:
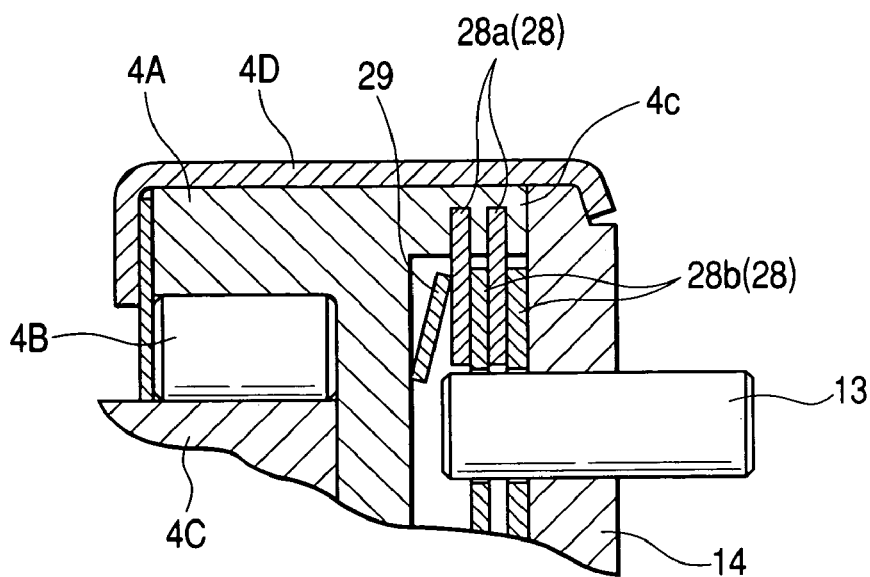
FIG. 2 is a partially sectional view which shows an impact absorber according to the second embodiment of the invention.

FIG. 2 shows an impact absorber according to the second embodiment of the invention.

The impact absorber includes a frictional assembly 28 made up of first friction plates 28a and second friction plates 28b. The first friction plates 28b are fitted within a cylindrical extension 4c formed integrally with the clutch outer 4A. The second friction plates 28b engage the gear spindles 13 each of which is press fit in the carrier plate 14. The first friction plates 28a and the second friction plates 28b are arrayed alternately in frictional abutment with each other.

The structure of this embodiment uses the gear spindles 13 to preclude relative rotation between the second friction plates 28b and the carrier plate 14. Specifically, the second friction plates 28b have formed therein circular holes into which the gear spindles 13 are fitted, thereby causing the second friction plates 28b to be rotated by the gear spindles 13. This eliminates the need for forming protrusions or grooves in the carrier plate 14 which work to establish a mechanical joint between the carrier plate 14 and the second friction plates 28b. In other words, it is unnecessary to machine the carrier plate 14 and use additional parts.

Other arrangements are identical with those in the first embodiment, and explanation thereof in detail will be omitted here.

Figure 3:
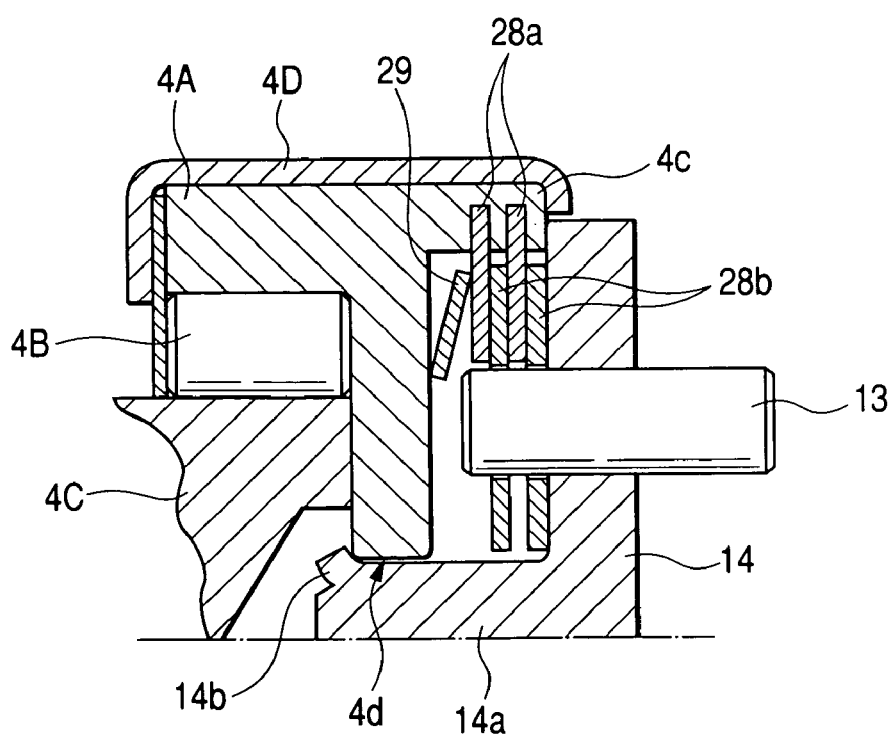
FIG. 3 is a partially sectional view which shows an impact absorber according to the third embodiment of the invention.

FIG. 3 shows an impact absorber according to the third embodiment of the invention which is different from the second embodiment of FIG. 2 in that the clutch outer 4A and the carrier plate 14 are designed to facilitate ease of coaxial alignment thereof with each other.

The carrier plate 14 has a boss 14a extending from the center of an end thereof into a central hole 4d formed in the clutch outer 4A. The boss 14a has formed in a top end thereof a circular cut to form an elastically deformable corner 14b which is staked elastically on an inner corner of the clutch outer 4A so as to permit the clutch outer 4A to rotate. The corner 14b also serves to press the spring plate 29 to add a desired initial load to the first and second friction plates 28a and 28b.

The structure of this embodiment is designed to increase the ease of coaxial alignment of the clutch outer 4A with the carrier plate 14 through insertion of the boss 14a into the hole 4d, thus eliminating the need for the clutch outer 4A to be configured to establish centering of the clutch outer 4A. Specifically, the clutch outer 4A needs not be curved or crimped at a rear end thereof (i.e., a right end, as viewed in the drawing for the coaxial alignment with the carrier plate 14. In this embodiment, the end of the clutch outer 4A is crimped inwardly to achieve a mechanical joint of the clutch outer 4A to the carrier plate 14, thereby eliminating an undesirable eccentric load on the clutch cover 4D, which permits the wall thickness of the clutch cover 4D to be decreased and also eliminates the need for a highly accurate inner diameter of the clutch over 4D. This results in decreased production costs of the starter 1.

The boss 14b may alternatively be formed on the clutch outer 4A, while the hole 4d may be formed in the carrier plate 14.

Other arrangements are identical with those in the first embodiment, and explanation thereof in detail will be omitted here.

The impact absorber in each of the above embodiments may use a wet type friction plate(s) coated with lubricant or grease as the friction plate 28 or the first and second fiction plates 28a and 28b. Adhesion of grease used in the overrunning clutch 4 or the planetary gear train to the friction plate 28 or the first and second friction plates 28a and 28b is not objectionable. Use of the wet type friction plate(s), thus, ensures the stability of sliding thereof.

In the above case, the clutch cover 4D also serves to hold the grease on the friction plate 28 (or the first and second friction plates 28a and 28b) urged outwardly by the centrifugal effect of the friction plate 28 from flowing out of thereof, thus avoiding seizing of the friction plate 28.

The spring plate 29 may alternatively be designed to work as the friction plate 28. This is achieved by placing only the spring plate 29 between the carrier plate 14 and the clutch outer 4A in friction abutment with both the carrier plate 14 and the clutch outer 4A. This structure eliminates the need for the friction plate 28 or the first and second friction plates 28a and 28b, thus resulting in a simplified structure of the impact absorber and permitting the length of the impact absorber in the axial direction of the starter 1 to be decreased.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An engine starter comprising:
   a motor working to output torque;
   a torque transmitting mechanism working to transmit the torque outputted by said motor to a ring gear of an engine, said torque transmitting mechanism including (a) a planetary gear train equipped with planet gears supported rotatably by gear spindles which are joined to a carrier plate, (b) an overrunning clutch including a clutch outer to which torque produced by reducing speed of an output of said motor through said planetary gear train is added through the carrier plate, a clutch inner having an inner helical spline formed on an internal circumferential wall thereof, and rollers, said overrunning clutch working to transmit the torque of the clutch outer to the clutch inner through the rollers, (c) an output shaft having an external helical spline which meshes with the internal helical spline of the clutch inner of said overrunning clutch for transmitting the torque exerted on the clutch inner to the output shaft and establishing travel of said output shaft within the clutch inner through a relative rotation between the external and internal helical splines, and (d) a pinion gear installed on said output shaft to be displaceable by the travel of said output shaft away from said motor to establish mechanical engagement with the ring gear of the engine; and
   an impact absorber working to absorb an undesirable impact energy applied to the clutch outer of the overrunning clutch of said torque transmitting mechanism, said impact absorber including at least one friction plate between the carrier plate and the clutch outer, when an impact torque added to the clutch outer is smaller than a given level, the friction plate working to hold the carrier plate and the clutch outer from rotating relative to each other, when the impact torque is greater than the given level, the friction plate permitting the carrier plate and the clutch outer from rotating relative to each other to block transmission of the impact energy from the clutch outer to the carrier plate, thereby absorbing the undesirable impact energy acting on the clutch outer.

2. An engine starter as set forth in claim 1, wherein one of the carrier plate and the clutch outer has a hole, and the other of the carrier plate and the clutch outer has a boss fitted within the hole to establish coaxial alignment of the carrier plate and the clutch outer with each other.

3. An engine starter as set forth in claim 1, wherein said impact absorber includes a first friction plate and a second friction plate, the first friction plate being jointed to and held by the clutch outer from rotating relative to the clutch outer, the second friction plate being joined to and held by the gear spindles from rotating relative to the carrier plate.

4. An engine starter as set forth in claim 1, wherein the carrier plate and the clutch outer have frictional surfaces, respectively, and wherein the friction plate is made of an elastic member which is retained elastically between the frictional surfaces of the carrier plate and the clutch outer so as to establish frictional abutment with the frictional surfaces of the carrier plate and the clutch outer.

5. An engine starter as set forth in claim 1, wherein the friction plate is implemented by a wet type friction plate which has a friction surface coated with lubricant.

6. An engine starter as set forth in claim 1, wherein the overrunning clutch includes a clutch cover disposed outside the clutch outer so as to surround the clutch outer, the clutch cover extending to the carrier plate to cover said impact absorber and the carrier plate.

7. An engine starter as set forth in claim 1, wherein one of the carrier plate and the clutch outer has a frictional surface facing the friction plate, and wherein said impact absorber also includes an elastic member working to elastically urge the friction plate into constant abutment with the frictional surface.

8. An engine starter as set forth in claim 7, wherein one of the carrier plate and the clutch outer has an elastic pressure producing member which acts physically on the elastic member to produce an elastic pressure which establishes the constant abutment of the friction plate with the frictional surface.

* * * * *